United States Patent [19]

McLennan

[11] 4,142,729
[45] Mar. 6, 1979

[54] GRAMOPHONE EQUIPMENT

[75] Inventor: Harold M. McLennan, Kinnesswood, Scotland

[73] Assignee: Pico Electronics Limited, Glenrothes, Scotland

[21] Appl. No.: 855,592

[22] Filed: Nov. 29, 1977

[30] Foreign Application Priority Data

Nov. 30, 1976 [GB] United Kingdom ............... 49947/76

[51] Int. Cl.² ........................ G11B 3/38; G11B 17/06; H01J 39/12; G06K 7/10
[52] U.S. Cl. ........................ 274/9 RA; 250/214 AG; 250/570; 274/15 R; 274/23 R
[58] Field of Search ................ 274/23 R, 15 R, 9 RA; 250/214 AG, 570, 563

[56] References Cited

U.S. PATENT DOCUMENTS

| 3,934,136 | 1/1976 | Schoon | 250/563 |
| 3,937,903 | 2/1976 | Osann | 274/15 R |

Primary Examiner—Steven L. Stephan
Attorney, Agent, or Firm—Morris Liss; Israel Gopstein

[57] ABSTRACT

A record player has a record track selection system using sensing means to scan a record to identify selected record tracks, the sensing means feeding signal processing circuitry having a gain or threshold adapted to individual record characteristics as determined by a record scan prior to track identification.

7 Claims, 7 Drawing Figures

GRAMOPHONE EQUIPMENT

BACKGROUND OF THE INVENTION

This invention relates to gramophone equipment and is particularly concerned with a record player having a turntable and a tone arm and comprising record track selection means including selector means for manually selecting a track, sensing means for scanning a record on said turntable to determine its reflectivity thereby to locate the bands of relatively low groove density between recorded tracks of the record and processing circuitry for processing the signal from the sensing means. Such equipment is described in U.K. Patent Application No. 13084/75 and Stimmler U.S. Specification No. 2952464.

In such systems, it has been found that the reflectivity of records varies considerably from record to record and, particularly in high quality records, across individual tracks of a single record. Thus, equipment with a signal threshold and gain for adequately detecting signal peaks produced by bands between tracks of a low quality record can give a false detection with a higher quality record, in which groove density can fall within a track to give a reflectivity of the same order as that occurring in a band of a low quality record. If, on the other hand, one manually adjusts the threshold or gain between records, this problem can be overcome although it is an inconvenient solution and one which is particularly disadvantageous will autochangers.

An object of the present invention is to provide equipment in which the threshold or gain is automatically adjusted to take individual record characteristics into account.

SUMMARY OF THE INVENTION

According to the present invention, there is provided a record player having a turntable and tone arm and comprising record track selection means including selector means for manually selecting a track, sensing means for scanning a record on said turntable to determine its reflectivity thereby to locate the bands of relatively low groove density between recorded tracks of the record and processing circuitry for processing the signal from the sensing means, characterised in that there are control means for causing the sensing means to scan the record prior to scanning for track selection, the processing circuitry having means for analysing the signal from the sensing means during the prior scan to obtain a measure of the peaks of said signal and to adjust the gain or threshold of the circuitry during scanning for track selection to a value dependent upon said measure to compensate for the variations which occur between different records in the amplitude levels of said signal.

For example, a record which produces relatively low amplitude signal peaks will require a higher gain or lower threshold than a record producing relatively high amplitude signal peaks.

DESCRIPTION OF THE DRAWINGS

For a better understanding of the invention and to show how the same may be carried into effect, reference will now be made, by way of example, to the accompanying drawings, in which.

DESCRIPTION OF EMBODIMENTS

Figure 1:
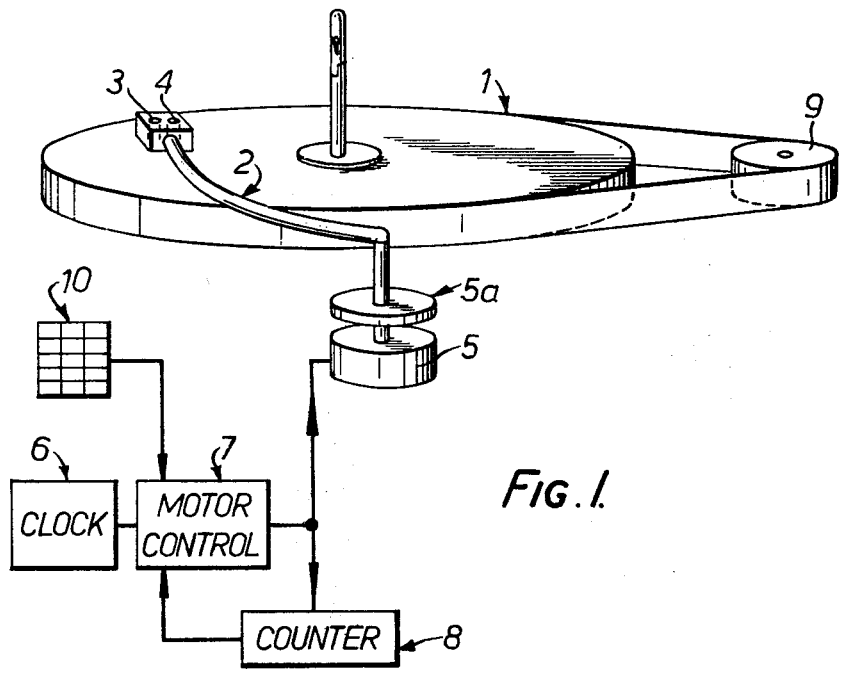
FIG. 1 is a diagrammatic view of gramophone equipment.

FIG. 1 is a diagrammatic representation of gramophone equipment substantially as described in U.K. Applications No. 13084/75 and No. 42237/76, the circuitry of which is more particularly described with reference to FIGS. 4a and 4b, 5 and 6.

The equipment includes a turntable 1 having a drive motor 9, a record lifting and lowering mechanism according to U.K. Application No. 42237/76 and a tone arm 2 carrying a light emitting device 3 for projecting light onto a record and a light sensitive device 4 for sensing the light reflected from reflective bands between tracks according to U.K. Application No. 13084/75. The signal from device 4 is compared with a track selection entered via keyboard 10 and the tone arm lowered when correspondence is found. Record selections can also be entered via the keyboard to operate the lifting and lowering mechanism.

In the present case, the tone arm 2 is driven via a magnetic clutch 5a by a stepping motor 5 fed with pulses by a pulse generator or clock 6. The number of pulses arriving at the motor and the direction of its rotation are determined by a motor control circuitry 7 in dependence upon a stored programme and in dependence upon data with regard to track selections input by way of a keyboard 10. A reversible counter 8 counts the pulses fed to the motor 5 to retain a count corresponding to tone arm position. The motor control circuitry 7 utilises this count as an actual value signal to control tone arm position. The programme controls motion of the tone arm 2 as described in Application No. 13084/75 and additionally in the present case causes the tone arm to scan across a major portion of the recorded surface when a record is first put on the turntable.

Figure 2:
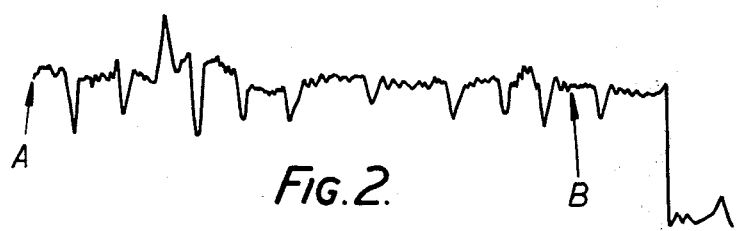
FIGS. 2 and 3 are waveforms.

FIG. 2 is the waveform of the signal produced by device 4 when scanning a multi-track record of popular music. The negative peaks correspond to the bands between tracks and are easily detected using an appropriate gain and threshold for the circuitry processing the signal. The sharp edge at the right is at the beginning of the record centre (run-out band or groove). At the left, the reflectivity of the record edge (run-in band or groove) is not represented as this has been electronically gated out by the circuit to be described hereinafter since the signal at and prior to the record edge has been found to be too unreliable in shape to give consistent information.

FIG. 2 shows, therefore, the signal which would be obtained in practice when scanning a record with the tone arm in its "up" position looking for a track beyond those actually provided, e.g. as if track 13 had been selected from a record with only twelve tracks.

Figure 3:
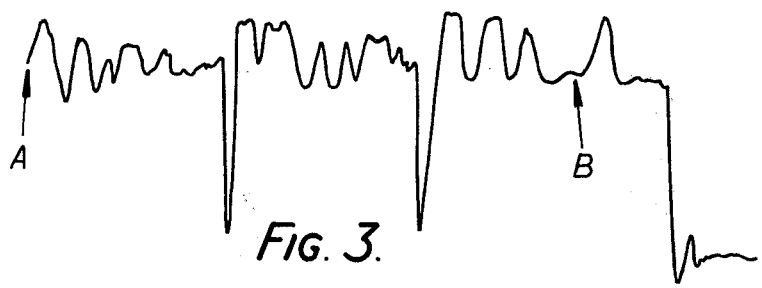

FIG. 3 shows a corresponding waveform for a high quality classical music record showing two high amplitude (negative-going) peaks corresponding to bands between tracks. Between the peaks there is considerable amplitude change arising from the large changes in groove density found in high quality records to accommodate a large range of dynamics.

Clearly, using an amplifier gain and threshold optimised for FIG. 2, one would obtain false detection of bands with the signal of FIG. 3. A much lower gain, or higher threshold, is required for the signal of FIG. 3. Especially with an autochanger, it is inconvenient to require the user to alter the gain (or threshold) as the records are changed, so the present embodiment has been designed to achieve an automatic change, in this example a change of gain.

For this purpose, a pre-scan is effected whenever a new record is about to be played, in order to evaluate the reflective properties of a record over the zone A to B. Point A is already defined by the system as the point at which the gating of the signal ceases and point B can be defined electronically or mechanically. In the former case the signal can be gated out on detecting that a given time has elapsed or a given number of pulses has been supplied to motor 5. In the latter case the pre-scan can be terminated after that time or after the given number of pulses has been fed to the motor.

In either case, the signal processing circuitry only processes the signal between points A and B. In this circuitry, the negative peaks are assessed and the gain (or threshold) adapted accordingly in readiness for the subsequent search, with the tone arm "up", for the first selected track of this new record. In the preferred embodiment, the amplitude of the greatest negative peak is measured as a basis for determining gain.

The circuitry for achieving this is shown in FIGS. 4a and 4b, 5 and 6.

Figure 4A:
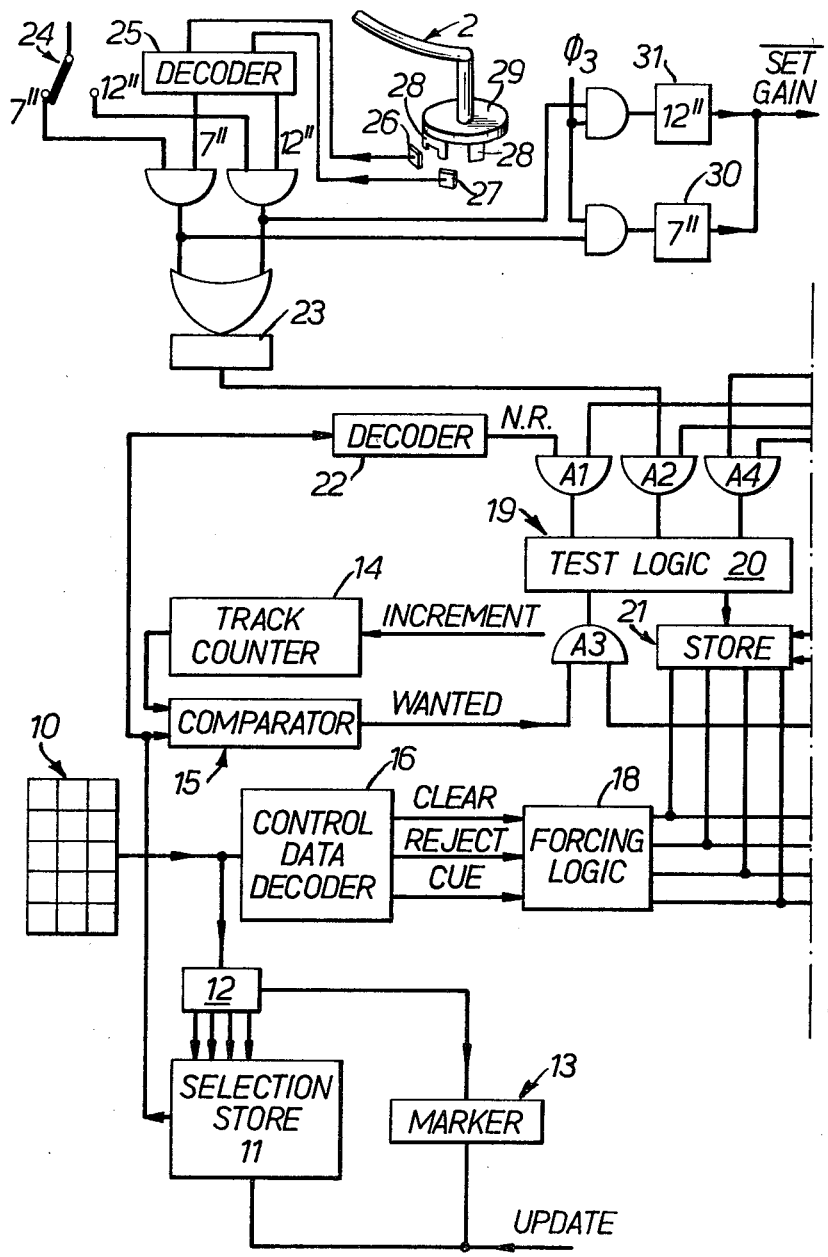
FIGS. 4a and 4b, 5 and 6 are circuit diagrams.
Figure 4B:
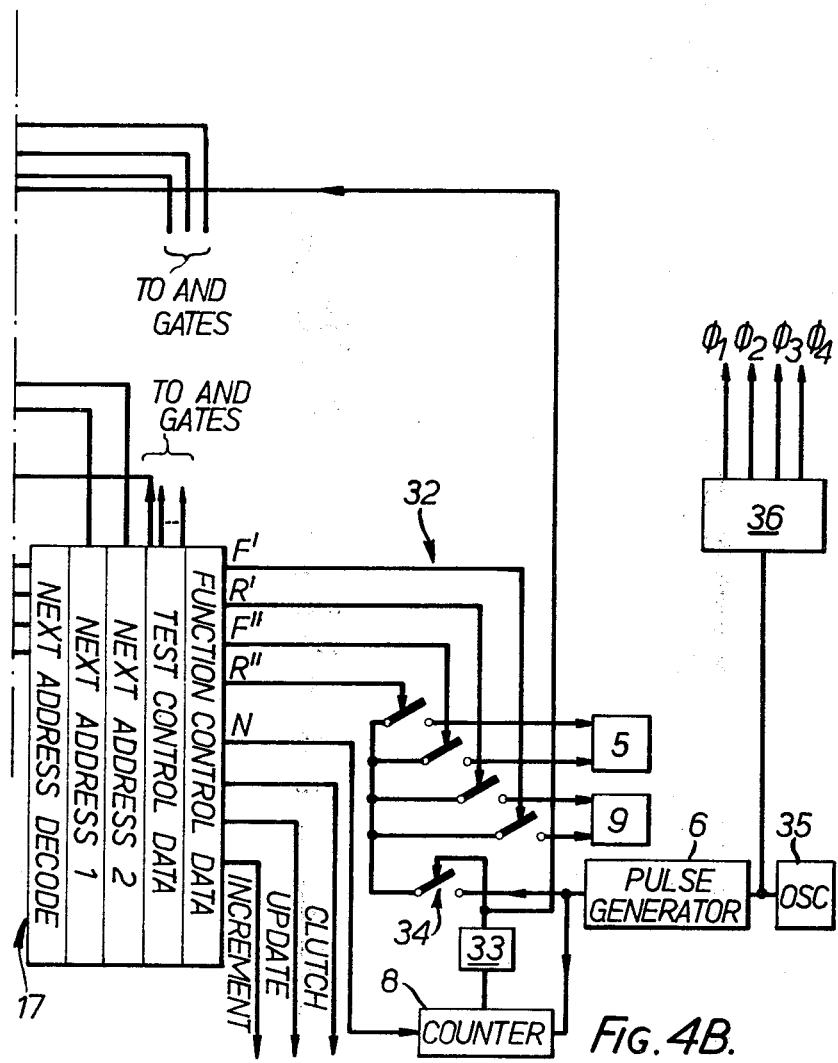

FIG. 4a and 4b is a circuit diagram of the overall control system and is similar to the control system of Application No. 13084/75 in having: the keyboard 10 feeding data to a track selection store 11 via data entry logic 12; a marker store 13 for storing a marker for store 11; a track counter 14; a comparator 15 for comparing data in the selection store 11 with data in the track counter 14 to identify wanted tracks; a control data decoder 16 for control or function data such as 'REJECT'; a read-only memory 17 storing programme data (two alternative "next" addresses, test control data and function control data); forcing logic 18 enabling memory 17 addresses to be selected by input data from decoder 16 derived from the keyboard; and test logic 19.

The test logic 19 comprises an OR gate 20 receiving data from a plurality of AND gates such as A1, A2, A3 and A4, and having an output connected to a store 21 to select (unless overridden by logic 18) one or other of two "next" addresses passed to the store from memory 17. The AND gates are driven by test control signals from memory 17 and only those relevant to the subsequent description are shown; further AND gates are also provided as described, for example, in Application No. 13084/75.

As for those AND gates shown, they have the following functions.

AND gate A1 identifies a N.R. signal from a decoder 22 sampling the selection store output and signifying the selection of a new record, i.e. defining when a pre-scan by the tone arm is required. Thus when signal N.R. is present at a time at which memory 17 passes a test control signal to AND gate A1, test logic 19 emits a signal selecting a given one of the two "next" addresses then in store 21, that address of memory 17 containing the data necessary for implementing a pre-scan.

AND gate A2 is used to identify an "edge flag" in a bistable circuit 23 denoting that the tone arm has passed a record edge. Once this is identified the memory is addressed so as to go to a section of its programme allowing incrementing of the track counter 14 by detected record bands; any bands "seen" by device 4 prior to the edge flag are likely to be the result of spurious signals and so are ignored in this way by the system.

AND gate A3 is used to detect a "wanted" signal defining when a band detected by device 4 corresponds to a track selection in store 11.

The circuit as described so far is in substance as described in Application No. 13084/75.

The AND gates of the test circuit in this embodiment of the present invention also include gate A4.

AND gate A4 is part of the servo-system of motor 5 and receives a signal defining when counter 8 has been counted down to '0', i.e. when the tone arm has reached a required position.

It is also possible in this embodiment for a user to stack on the centre spindle of the turntable a stack of 7" records or 12" records (but not a mixture). Whatever stack is provided, the user will define the appropriate size by a switch 24 which in conjunction with an edge decoder 25 sets the bistable circuit 23. Decoder 15 is supplied with data concerning tone arm angular position from two light-sensitive devices 26 and 27 responding to light which can be intercepted by lugs 28 on a rotor 29 rotating with the tone arm. The decoder determines from the signal from the devices 26 and 27 when the tone arm is at the edge of a 7" record, at the edge of a 12" record and also when it has reached a given centre region. The two edge defining signals are used in this embodiment to define point A of the waveforms of FIGS. 2 and 3. The edge signals are passed to two monostable circuits 30 and 31 defining the duration from A to B for a 7" and a 12" record respectively. A SET GAIN signal results to control processing from point A to B during the pre-scan as will be described with reference to FIGS. 5 and 6.

Returning now to memory 17, this produces a set of function control signals including a clutch (5a) actuating signal, an UPDATE signal for stores 11 and 13, and an INCREMENT signal for track counter 14, as in Application No. 13084/75.

In addition it provides signals F', R', F'', R'' and N to control motors 5 and 9. Signal N defines the number of pulses to be supplied to one or other motor and presets counter 8. Signals F', R', F'', and R'' operate switches 32 to select forward or reverse drive to the motors 5 and 9. A zero detect circuit 33 looks for a 'O' content in counter 8 and when found opens a switch 34 coupling the motors to the pulse generator 6 fed by oscillator 35. Thus, the pulse generator drives the selected motor in the selected direction until the required number of pulses has been counted, following the scheme described in Application No. 42237/76.

Figure 5:
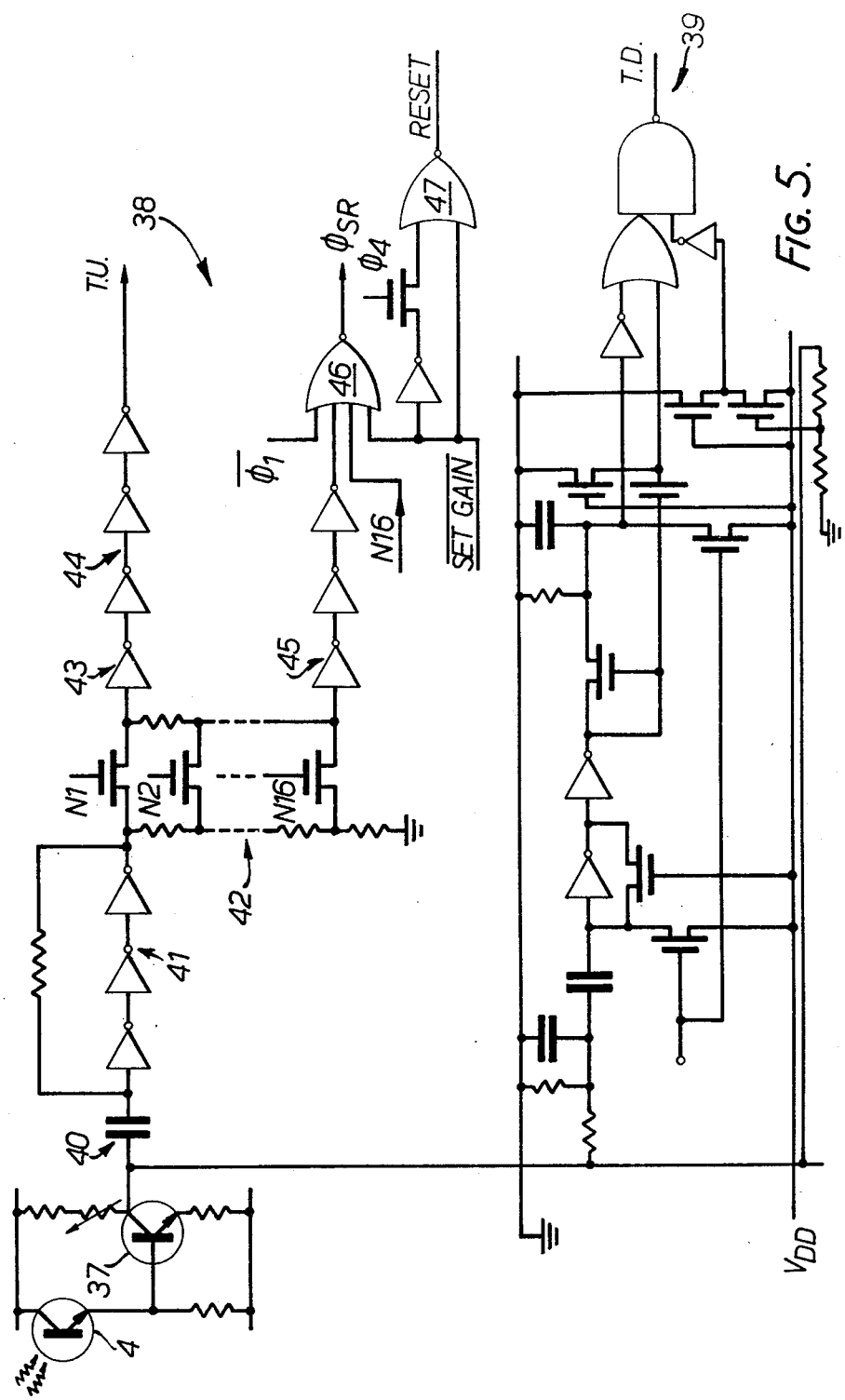

The oscillator 35 also feeds a timing generator 36 supplying timing pulses for the system as a whole, and in particular for the circuit of FIG. 5.

Figure 6:
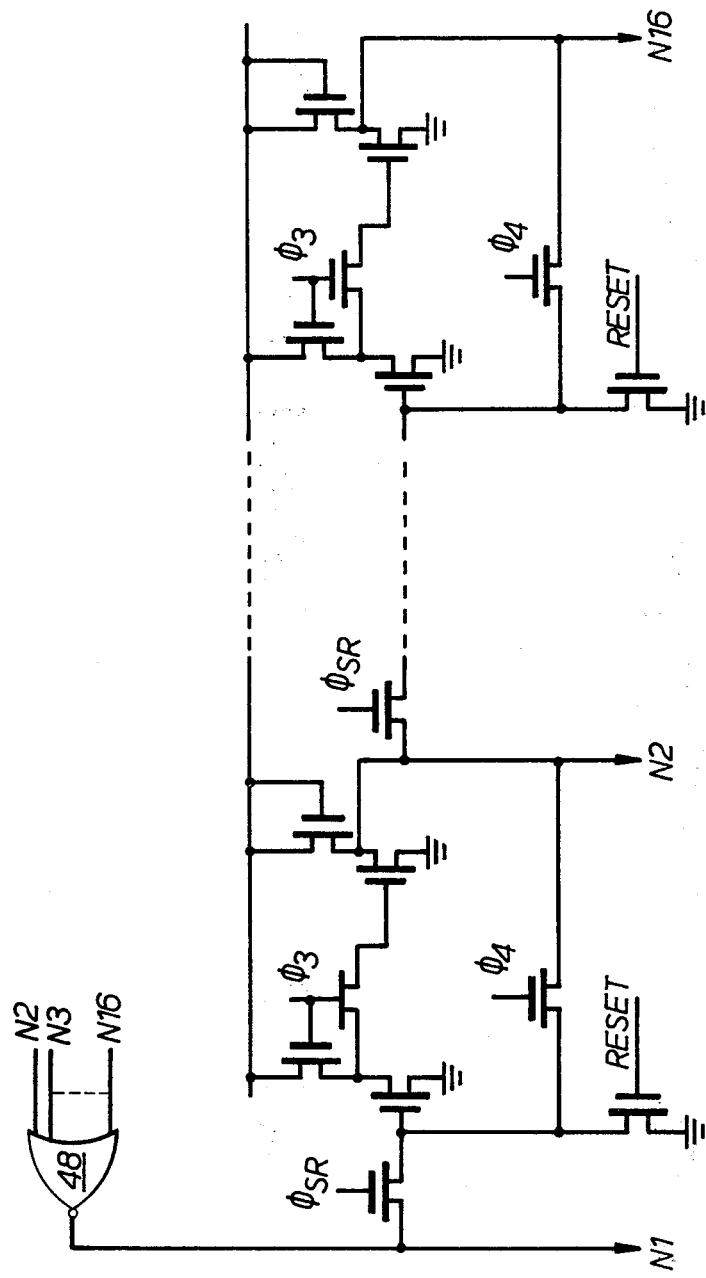

FIG. 5 shows processing circuitry for the signal of device 4 including means for automatic gain adjustment and FIG. 6 is a circuit diagram of a shift register associated with the circuitry of FIG. 5.

In FIG. 5, device 4 is shown connected to an amplifying transistor 37 the output of which is fed to two channels 38 and 39, respectively for the "up"-position and "down"-position of the tone arm. Channel 39 is substantially as disclosed in Application No. 13084/75.

In channel 38, there is a differentiator 40 and threshold elements 41 feeding a ladder network 42 of resistances and switches (transistors). The switches are switched in turn, by timing signals N1 to N16 derived from the shift register of FIG. 6 to alter the attenuation in steps in channel 38.

The output of the ladder network 42 feeds an amplifier 43 connected to inverters 44 to shape the signal and to an amplifier 45 feeding a NOR gate 46 to produce a shift register timing signal $\phi$SR. The SET GAIN signal from FIG. 4a is supplied to a NOR gate 47 to produce a reset pulse at point A for the shift register of FIG. 6, i.e. NOR gate 47 responds only to the leading edge of the SET GAIN signal.

The shift register (FIG. 6) comprises fifteen stages, producing outputs N2 to N16, and a feedback path via NOR gate 48 producing output N1.

The operation of the circuits of FIGS. 5 and 6 will now be described. When the tone arm has begun its pre-scan, the point A will be reached and the SET GAIN signal will commence, causing the RESET signal to put outputs N2 to N16 all at logic '0', so that N1 goes to logic '1'. This renders conductive the uppermost transistor of network 42 of FIG. 5, i.e. setting network 42 to its highest gain. When the input signal from device 4 subsequently has a negative peak which exceeds the threshold of inverter 45 gate 46 produces signal $\phi$SR to shift the register one stage and thus reduce the gain of the network 42. For each signal $\phi$SR, the shift register moves on one bit and so reduces the gain of the network 42 one step. When the gain has been so reduced that the input signal can no longer reach the threshold of inverter 45, the shift register receives no more clock signals $\phi$SR. The register is then effectively static, each stage having feedback to retain the logic '1' state at the bit position corresponding to the largest negative peak of the input signal. The signal $\phi$SR is also inhibited by N16 to prevent further clocking past the N16 stage by an exceptionally high peak. Also, when point B is reached, the resulting trailing edge of the SET GAIN signal inhibits $\phi$SR to prevent further clocking if this has not already been achieved by signal N16.

When the tone arm reaches the centre region of the record, it returns to rest and recommences its scan to look for the first detected track. During this stage of operation, the shift register is producing the stored one of signals N1 to N16 selected according to the peak level detected during the pre-scan. The appropriate portion of the network 42 is thereby rendered conductive to give channel 38 the required gain via the path through amplifier 43. If amplifiers 43 and 45 had the same threshold only the largest peaks would succeed in reaching the output in view of the attenuation then created by the network 42. Accordingly amplifier 43 has in practice a lower threshold so that peaks of approximately 50% of the largest peak detected can pass to the output of channel 38, all such peaks at the output being squared and of substantially the same level by virtue of elements 44.

In this embodiment, when the tone arm is down channel 39 is utilised. However, it is also possible to feed channel 39 from channel 38 so that gain control is applied in all situations.

In yet another modification, switch 24 is dispensed with and record size is detected using data from devices 26 and 27 (to define when 12" and 7" edges are to be expected) and data from device 4 (to identify a reflectivity corresponding to a record edge).

It is also possible to replace the shift register by a random access memory and drive it in synchronisation with the switches of network 42 by timing signals generated by oscillator 36. In that case, the switches are rendered conductive in the direction from the highest to lowest attenuation. A point will be reached at which a peak is detected, this causing a logical '1' to enter the random access memory which, by a feedback path including a 1-bit delay element, will then block the entry of further logical '1's. When point B is reached, the random access memory will contain a logical '1' defining the network switch to be conductive during track searching. During searching, the switches and the memory are cycled by the timing signals and the network output is gated by the '1' in the memory to deliver only those portions of the signal of device 4 which pass through the desired part of network 42.

In another modification, the threshold of the circuitry can be adjusted according to signal peak level instead of or as well as gain. Thus, for example, the resistors of network 42 can be replaced by elements having thresholds which increase from one end to the other of the network.

I claim:

1. A record player comprising:
    a turntable;
    a tone arm having a pick-up;
    record track selection means for selecting a track of a record to be played by the player;
    sensing means for scanning across a record on said turntable to produce a signal representing the record reflectivity thereby to identify bands of relatively low groove density separating recoded tracks of a record;
    control means for causing the sensing means to effect a first and a second scan of a record on said turntable, the first to assess record reflectivity and the second to identify the band immediately preceding the track selected by said record track selection means;
    means for causing the pick-up to engage with the band identified during the second scan; and
    processing circuitry for processing the signal of the sensing means and having means for analysing the signal of the sensing means during the first scan to obtain a measure of the peaks of said signal and means for adjusting at least one of the gain value and threshold value of the circuitry during the second scan in dependence upon said measure and in the sense tending to compensate for the variations which occur between records in the amplitude levels of said signal.

2. A record player according to claim 1, wherein the analysing means is operable to obtain said measure from the level of the greatest peak it is able to detect in the signal obtained from the sensing means during the first scan.

3. A record player according to claim 2, wherein the analysing means utilizes the adjusting means for obtaining a measure of the peaks of the signal.

4. A record player according to claim 3, wherein the adjusting means comprises means for adjusting said value in steps.

5. A record player according to claim 4, wherein the adjusting means comprise a ladder network of switches and influencing elements for influencing one of the gain and threshold values of the circuitry, the switches being operable in a sequence to sequentially step said one value.

6. A record player according to claim 5, wherein the analysing means comprises a multi-stage register arranged to step in synchronism with said switches to store a bit in a stage corresponding to the switch associated with the required circuitry value, that register bit then governing the adjusting means of the processing circuitry during the second scan.

7. A record player according to claim 6, wherein the register is a random access memory providing switching signals for said switches.

* * * * *